US006786946B2

(12) United States Patent
Jung

(10) Patent No.: US 6,786,946 B2
(45) Date of Patent: Sep. 7, 2004

(54) DUST COLLECTOR WITH ASSEMBLY OF CYLINDRICAL AND HEXAHEDRAL BAG FILTER

(75) Inventor: Bong Kyu Jung, Seoul (KR)

(73) Assignee: Gong Young Engineering Co., Ltd., Seoul (KR)

( * ) Notice: Subject to any disclaimer, the term of this patent is extended or adjusted under 35 U.S.C. 154(b) by 12 days.

(21) Appl. No.: 10/302,435

(22) Filed: Nov. 22, 2002

(65) Prior Publication Data

US 2003/0200733 A1 Oct. 30, 2003

(30) Foreign Application Priority Data

Apr. 30, 2002 (KR) ........................................ P2002-23706

(51) Int. Cl.[7] .......................... B01D 46/02; B01D 46/04
(52) U.S. Cl. .......................... 55/302; 55/341.1; 55/372
(58) Field of Search ............................... 55/302, 341.1, 55/341.6, 372, 378, 381, DIG. 12, DIG. 26

(56) References Cited

U.S. PATENT DOCUMENTS

| 3,057,137 A | * | 10/1962 | Perlis et al. ................... 55/303 |
| 3,177,636 A | * | 4/1965 | Jensen ....................... 55/341.1 |
| 3,187,487 A | * | 6/1965 | Loewen ...................... 55/341.1 |
| 3,256,679 A | * | 6/1966 | Snyder ........................ 55/293 |
| 3,480,330 A | * | 11/1969 | Hirs et al. ................... 406/172 |
| 3,491,518 A | * | 1/1970 | Williams ...................... 55/284 |
| 3,509,698 A | * | 5/1970 | Medcalf et al. ............... 55/302 |
| 3,520,109 A | * | 7/1970 | Caskey ........................ 95/280 |
| 3,853,509 A | * | 12/1974 | Leliaert ...................... 55/341.1 |
| 4,264,345 A | * | 4/1981 | Miller ....................... 55/341.1 |
| 4,574,420 A | * | 3/1986 | Dupre ......................... 15/331 |
| 4,735,635 A | * | 4/1988 | Israelson et al. ............... 95/20 |
| 4,812,149 A | * | 3/1989 | Griffin et al. ................. 95/280 |
| 4,960,448 A | * | 10/1990 | Zievers ....................... 55/523 |
| 6,551,368 B1 | * | 4/2003 | Kordas ........................ 55/302 |
| 6,676,720 B1 | * | 1/2004 | Simonsen .................... 55/302 |
| 2002/0073849 A1 | * | 6/2002 | Buettner et al. ............... 95/280 |

FOREIGN PATENT DOCUMENTS

| GB | 2063099 A | * | 6/1981 |
| GB | 2177321 A | * | 1/1987 |

* cited by examiner

*Primary Examiner*—Robert H. Spitzer
(74) *Attorney, Agent, or Firm*—Grossman & Flight, LLC

(57) ABSTRACT

Dust collector with an assembly of cylindrical and hexahedral bag filters for smooth recovering dust by making a direction of a discharge air flow the same with the direction of free fall of the dust naturally, wherein dirty air is drawn through an upper part of one side of a hexahedral housing having a hopper at a lower part, is guided downward directly, involved in filtering the dust therein by a plurality of cylindrical bag filters, to become a clean air, collected in the cylindrical bag filters and the hexahedral bag filters, and discharged to a lower part of the housing, while the dust is recovered by a rotary valve.

3 Claims, 5 Drawing Sheets

DUST COLLECTOR WITH ASSEMBLY OF CYLINDRICAL AND HEXAHEDRAL BAG FILTER

This application claims the benefit of the Korean Application No. P2002-23706 filed on Apr. 30, 2002, which is hereby incorporated by reference.

BACKGROUND OF THE INVENTION

1. Field of the Invention

The present invention relates to a dust collector which collects various dust produced at industrial sites for prevention of fly or scattering of the dust, and more particularly, to a dust collector with an assembly of cylindrical and hexahedral bag filters, of cloth of chemical fiber, natural fiber, or metallic fiber fitted in a filter housing for filtering the dust entering into the filter housing.

2. Background of the Related Art

In general, the dust collector is an apparatus for separating different dust (general dust, zinc oxide, fume, saw dust, cotton, shavings, grain dust, wool, lead dust, and the like) produced at industrial sites from air, to discharge cleaned air to the atmosphere, thereby preventing pollution of the atmosphere with dust. The dust collector employs a filter, or bag filter for filtering the dust.

The dust collector with the bag filter is basically provided with a plurality of cylindrical or envelope type bag filters fitted in a housing. In the dust collector, air containing dust is introduced into the housing, and discharged to an outside of the housing after the air passes through the bag filters.

A related art dust collector with cylindrical bag filters will be explained. FIG. 1 illustrates a section of a related art dust collector with cylindrical bag filters, and FIG. 2 illustrates a section of a key part of a related art dust collector with cylindrical bag filters.

As shown, the housing 1 in a hexahedral form is provided with a hopper 1a fitted to a bottom thereof. There is a bag filter holder 2 in the housing 1 for partitioning a lower part as a filtering and dust collecting region, and an upper part as a cleaned air discharge region. The hopper 1a has an inlet tube 3 connected thereto for introducing dirty air (air+dust) into the filtering and dust collecting region. The bag filter holder 2 has a plurality of cylindrical bag filters 4 each with opened top vertically fitted thereto for filtering the dust in the dirty air introduced into the filtering and dust collecting region of the housing 1 through the inlet tube 3. There is a rotary valve 5 fitted to a bottom end of the hopper 1a for receiving the dust filtered by the cylindrical bag filters 4 when the filtered dust fall down by gravity. There is an outlet tube 6 connected to a side of the upper part of the housing 1 opposite to the inlet tube 3 for discharging the cleaned air discharged to the clean air discharge region to outside of the housing 1. There is a compressed air supply tube 7 having a plurality of nozzles 7a above the bag filter holder 2 for receiving compressed air from an outside of the bag filter and supplying the compressed air to insides of the cylindrical bag filters 4. There is a fan 8 at an end of the outlet tube 6 for providing a discharge force of the clean air through the outlet tube 6 and a suction force of the dirty air through the inlet tube 3.

In installation of the related art dust collector with the cylindrical bag filters at an industrial site, it is required that an end of the inlet tube 3 connected to the hopper 1a is connected to a hood in a state the housing 1 is supported on a supporting plane.

Upon putting the fan 8 fitted to the outlet tube 6, air in the housing 1 is discharged outside of the housing 1 through the outlet tube 6, to drop a pressure inside of the housing 1 to generate a suction force. According to this, the dirty air is drawn into the housing 1 through the inlet tube 3 connected to the hood from a dust source.

Once the dirty air is introduced into the housing 1, a portion of the dust in the dirty air is fallen down and collected to the hopper 1a of the housing 1 by gravity, directly. However, most of the dust is moved upward toward the outlet tube 6 carried on the air, and passes the plurality of cylindrical bag filters 4, when the dust in the dirty air is filtered at the cylindrical bag filters. As the cylindrical bag filters 4 have opened tops, only clean air without the dust is discharged to the clean air discharge region, and discharged to an outside of the housing 1 through the outlet tube 6 as the fan 8 is operative, continuously.

In the meantime, when above operation is continued, there will be a state in which much dust is stuck to the cylindrical bag filter 4 such that a dust collecting efficiency is dropped due to an excessive pressure loss in the housing 1. If this state continues, the fan 8 at the outlet tube 6 is liable to be overloaded, and, when extreme, the motor on the fan is liable to be damaged. Accordingly, for preventing this state in advance, high pressure air (about 4–7 $km/cm^2$) is blown to the cylindrical bag filters 4 periodically (3–6 min. interval), for removal of the dust stuck to the cylindrical bag filters.

That is, when an air compressor 9 provided on an outside of the housing 1 compresses air in response to a control signal of a controller (not shown), the compressed air is supplied to the clean air discharge region in the housing 1 through the compressed air supply tube 7, and blown downwardly through the plurality of nozzles 7a in the compressed supply tube 7. This high pressure air enters into the cylindrical bag filter 4 through the top opening, to make the dust stuck to the cylindrical bag filter 4 to fall off by the blow pressure of the compressed air and drop down by gravity. Eventually, as there is no excessive pressure loss in the housing 1 for a certain time period, the dust collector shows no deterioration of the dust collecting efficiency.

Most of the dust fallen off the cylindrical bag filter 4 drops by gravity and settles down so as to be collected in the hopper 1a, and is received at the rotary valve 5 under the hopper 1a. However, a portion of the dust fallen off the cylindrical bag filter 4 is flown again in a course of natural falling by the dirty air drawn into the housing 1 continuously through the inlet tube 3, and stuck to the cylindrical bag filter 4 again together with the dust in the dirty air.

In the dust collector with cylindrical bag filters, the opposite directions of the dirty air flow and falling off of the dust cause the following problem.

First, a portion of the dust fallen off the cylindrical bag filter by the compressed air can not fall freely but is laden on the dirty air, and stuck to the cylindrical bag filter, again. Consequently, the drop of filtering capability and the dust collecting capability cause an increased concentration of dust in the housing, as well as a pressure drop, that shortens a lifetime of the cylindrical bag filter.

Second, the downward blow of high pressure air for removing the dust from the cylindrical bag filter interferes with the dirty air moving upward toward the outlet tube 6. According to this, the dust stuck to the cylindrical bag filter, particularly, the dust stuck to a lower part thereof, can not be fallen off. Moreover, this becomes the worse, as a length of the cylindrical bag filter is the longer. Therefore, the length of the cylindrical bag filter can not but be short, to required an enlargement of a horizontal area of the body and increase a number of the cylindrical bag filter for obtaining a desired dust collecting effect. At the end, an occupied area of the dust collector is increased.

Third, even though a high capacity fan is required, which can provide adequate clean air discharge force through the outlet tube and dirty air suction force through the inlet tube, this increases an entire fabrication cost as components cost is increased.

Fourth, in the related art dust collector with cylindrical bag filters, since a lower end of the cylindrical bag filter is not held, though an upper end of the cylindrical bag filter is held by the bag filter holder, the cylindrical bag filters are shaken extremely, unable to achieve a stability, influenced by an air flow in a course the dirty air suction into the housing and the clean air discharge to the outside of the housing. Eventually, a lifetime of the bag filter is reduced.

SUMMARY OF THE INVENTION

Accordingly, the present invention is directed to a dust collector that substantially obviates one or more of the problems due to limitations and disadvantages of the related art.

An object of the present invention is to provide a dust collector which can recover dust laden on dirty air as well as dust removed from a bag filter without interference as the dust falls down by gravity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the dust collector with an assembly of cylindrical and hexahedral bag filters includes a housing in a form of a hexahedral tank with a closed top having a hopper fitted to a bottom thereof, an inlet tube connected to one side of an upper part of the housing for introducing dirty air into the housing, a bag filter holding plate fixed to an upper part of an inside of the housing, a partition plate inside of the housing in a part the inlet tube is connected to the housing for isolating an upper region with reference to the bag filter holding plate from the other region, and guiding the dirty air introduced through the inlet tube downward directly, a plurality of cylindrical bag filters each with opened top and bottom held to the bag filter holding plate, for filtering dust from the dirty air introduced into the housing, a rotary valve fitted to a bottom end of the hopper for receiving the dust filtered by the cylindrical bag filters when the filtered dust falls down, and settled by gravity, hexahedral bag filters each formed as a unit with the cylindrical bag filters under the cylindrical bag filters for collecting clean air after the dirty air is filtered by the cylindrical bag filters, an outlet tube connected to one side of the hexahedral bag filters for discharging clean air collected in the hexahedral bag filter to outside of the dust collector, a fan at an end of the outlet tube for providing a discharge force through the outlet tube and a suction force of the dirty air through the inlet tube, and a compressed air supply tube having a plurality of nozzles above the bag filter holding plate for blowing compressed air from an outside of the dust collector to insides of the cylindrical bag filters in a vertical direction.

Preferably, each of the hexahedral bag filters includes a group of the cylindrical bag filters fitted thereto.

Each of the hexahedral bag filters is fastened to the housing, for stable holding of the hexahedral bag filters.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
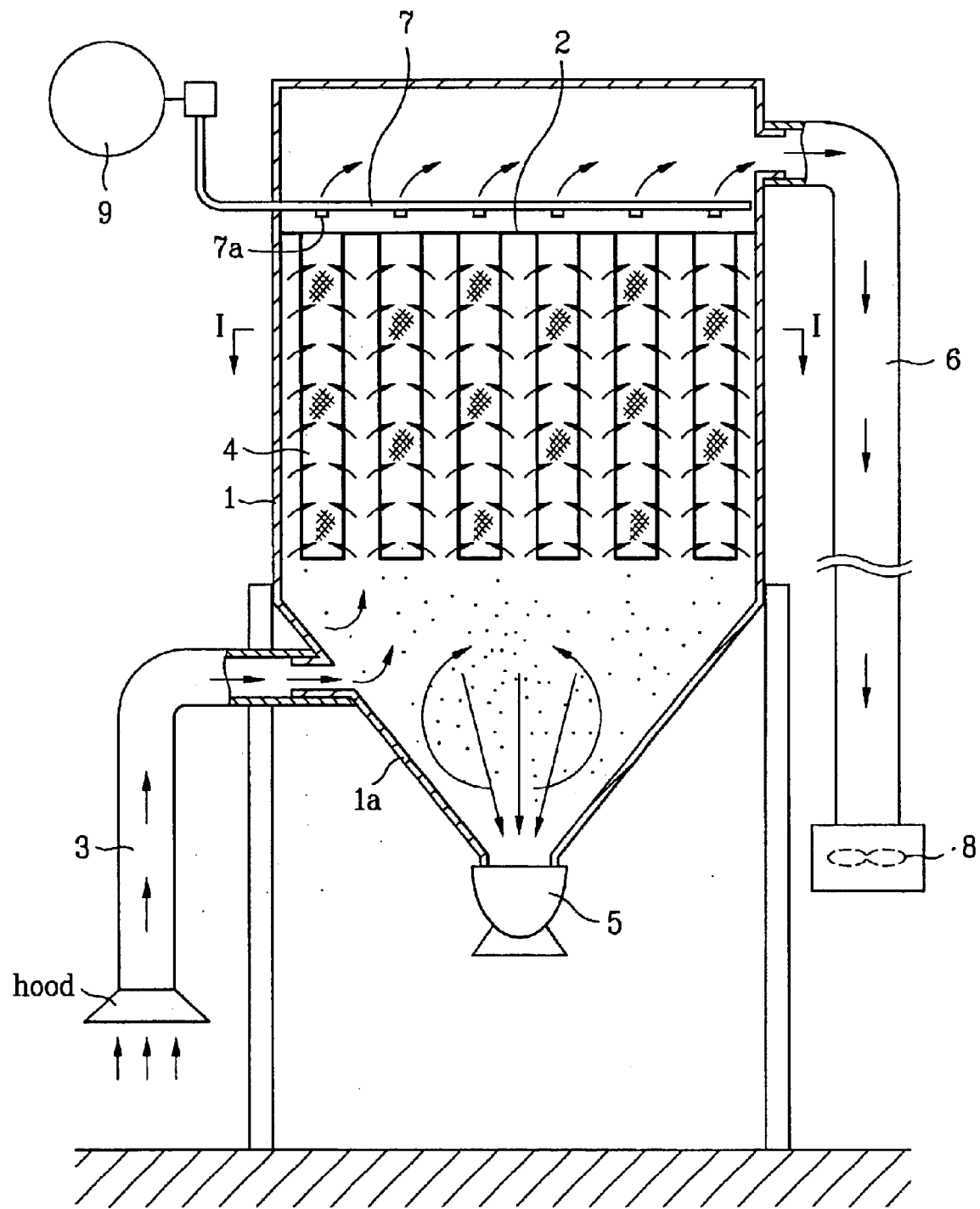
FIG. 1 illustrates a section of a related art dust collector with cylindrical bag filters.
Figure 2:
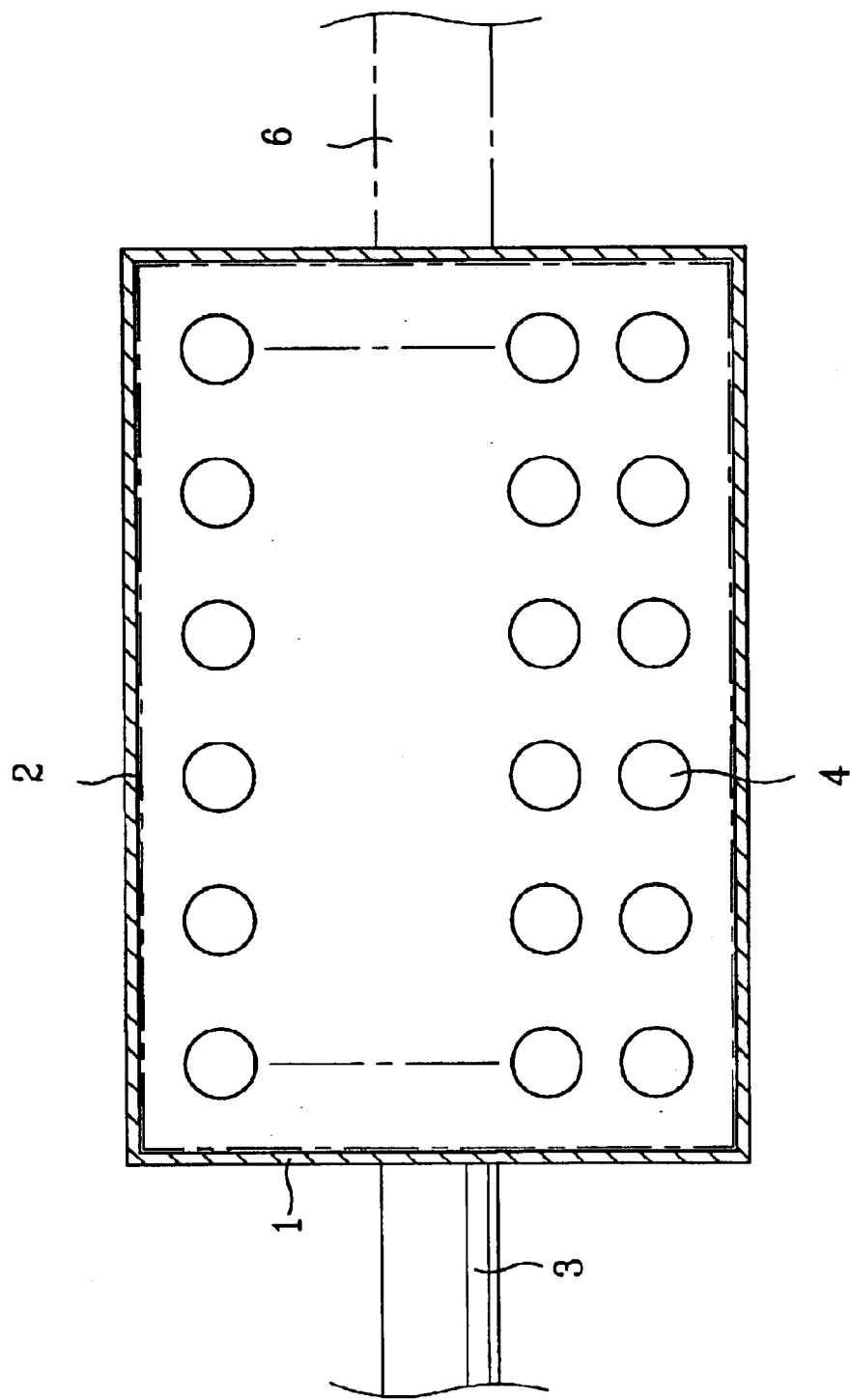
FIG. 2 illustrates a section across a line I—I in FIG. 1.
Figure 3:
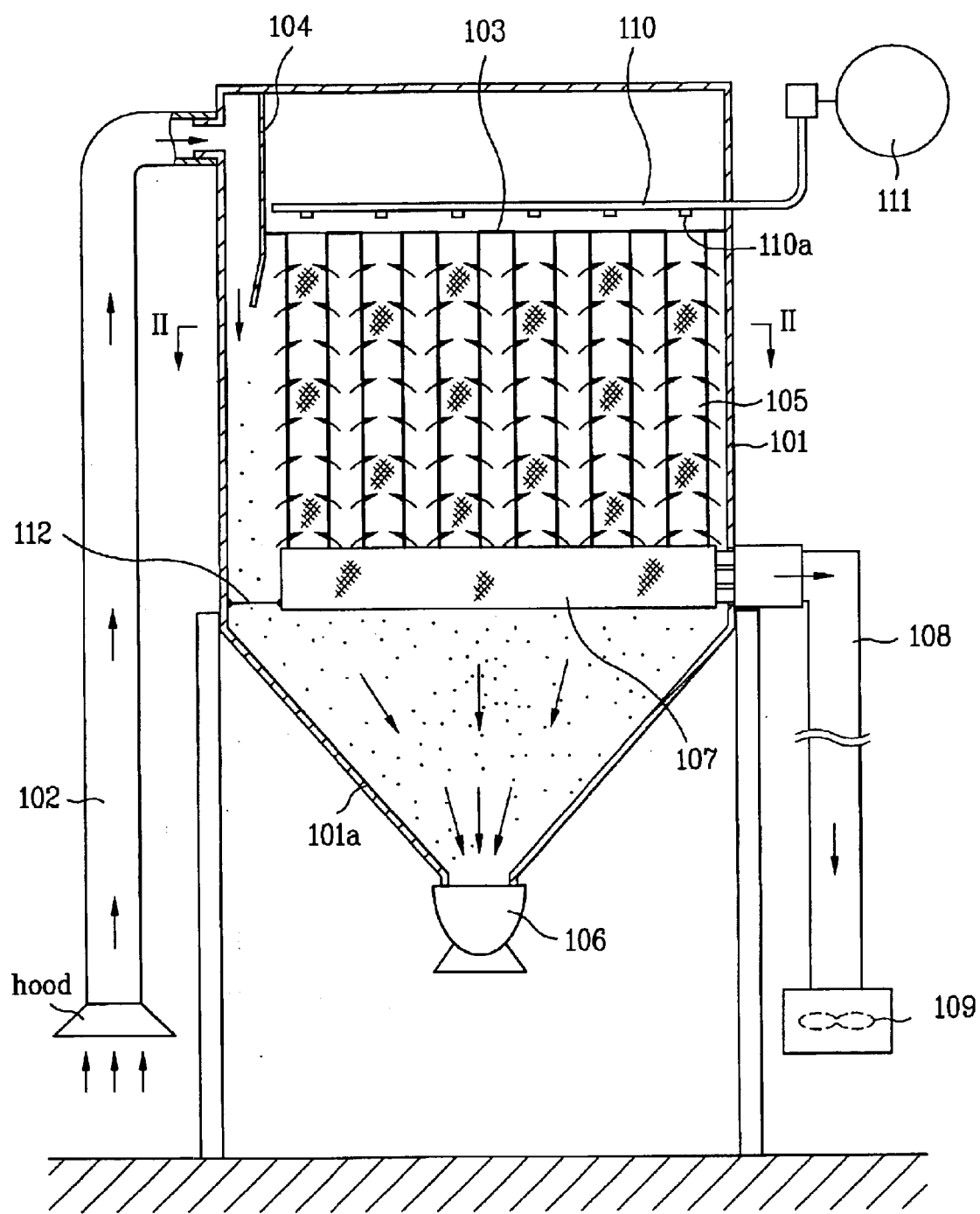
FIG. 3 illustrates a section of a dust collector with an assembly of cylindrical and hexahedral bag filters in accordance with a preferred embodiment of the present invention.
Figure 4:
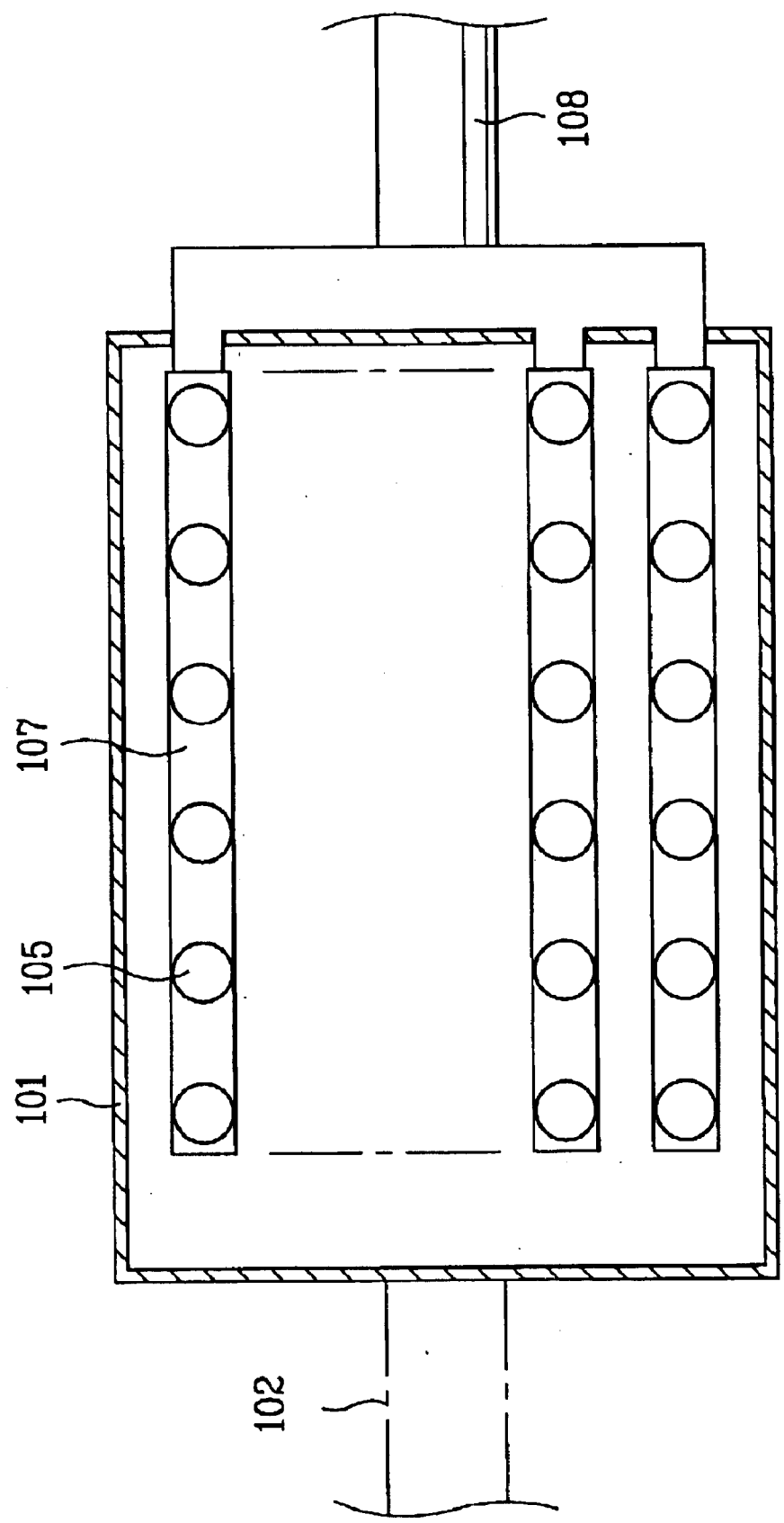
FIG. 4 illustrates a section across a line II—II in FIG. 3.
Figure 5:
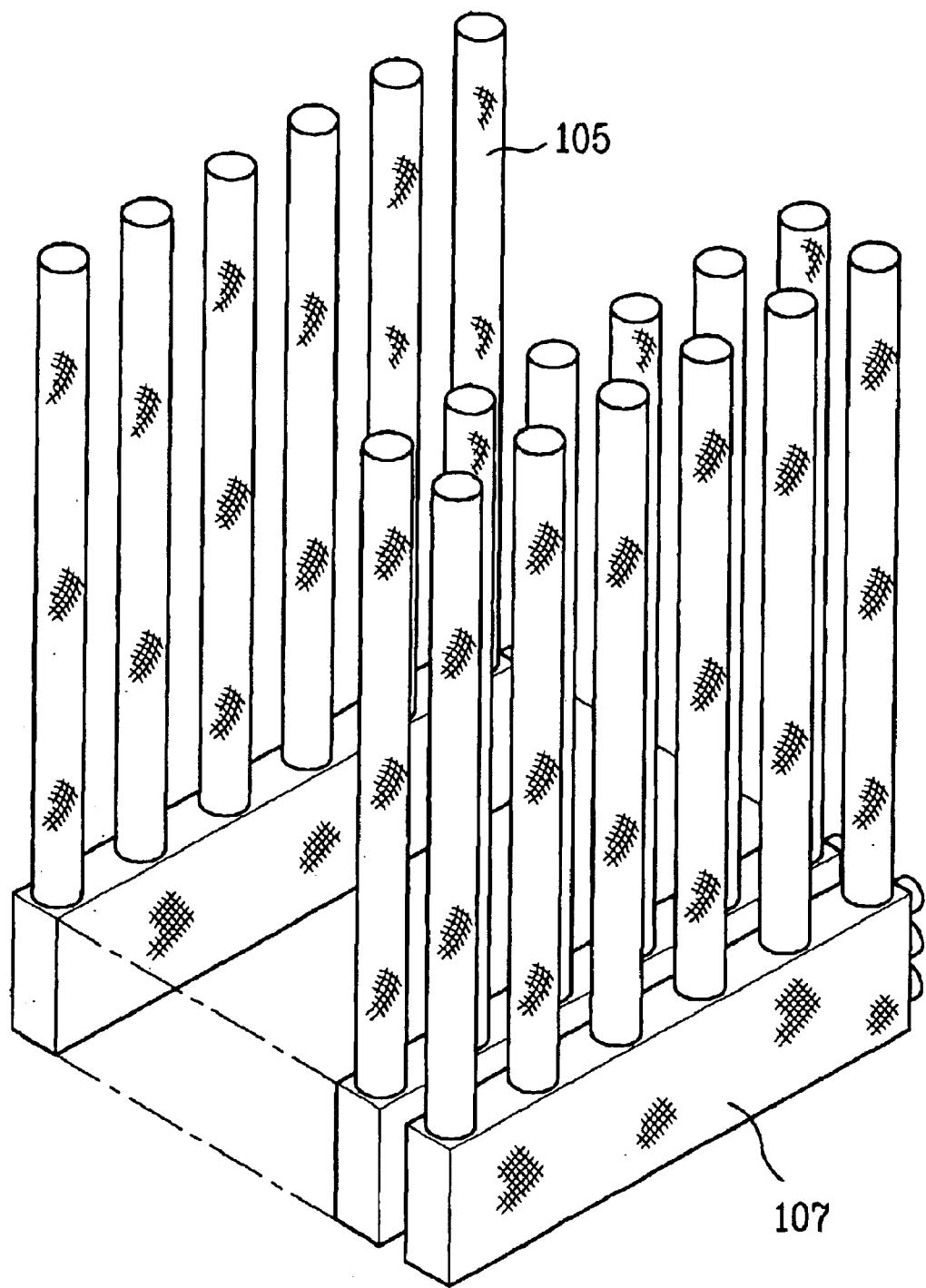
FIG. 5 illustrates a perspective view of key parts of a dust collector with an assembly of cylindrical and hexahedral bag filters in accordance with a preferred embodiment of the present invention.

Reference will now be made in detail to the preferred embodiments of the present invention, examples of which are illustrated in the accompanying drawings. FIG. 3 illustrates a section of a dust collector with an assembly of cylindrical and hexahedral bag filters in accordance with a preferred embodiment of the present invention, FIG. 4 illustrates a section across a line II—II in FIG. 3, and FIG. 5 illustrates a perspective view of key parts of a dust collector with an assembly of cylindrical and hexahedral bag filters in accordance with a preferred embodiment of the present invention. The dust collector in accordance with a preferred embodiment of the present invention will be explained, in detail.

The dust collector includes a housing 101 in a form of a hexahedral tank with a closed top having a hopper 101a fitted to a bottom of the housing 101. There is an inlet tube 102 connected to one side of an upper part of the housing for introducing dirty air into the housing 101, and there is a bag filter holding plate 103 in an upper part of an inside of the housing 101. There is a partition plate 104 inside of the housing 101 in a part the inlet tube 102 is connected to the housing 101 for isolating an upper region with reference to the bag filter holding plate 103 from the other region, and guiding the dirty air introduced through the inlet tube 102 direct downward. The bag filter holding plate 103 has a plurality of cylindrical bag filters 105 each with opened top and bottom held thereto, for filtering dust from the dirty air introduced into the housing 101. There is a rotary valve 106 fitted to a bottom end of the hopper 101a for receiving the dust filtered by the cylindrical bag filters 105 when the filtered dust falls down, and settled by gravity. There are hexahedral bag filters 107 each formed as a unit with the cylindrical bag filters 105 under the cylindrical bag filters 105 for collecting clean air after the dirty air is filtered by the cylindrical bag filters 105. There is an outlet tube 108 connected to one side of the hexahedral bag filters 107 for discharging clean air collected in the hexahedral bag filter to outside of the dust collector, and there is a fan 109 at an end of the outlet tube for providing a discharge force through the outlet tube 108 and a suction force of the dirty air through the inlet tube 102. There is a compressed air supply tube 110 having a plurality of nozzles 110a above the bag filter holding plate 103 for blowing compressed air from an outside of the dust collector to insides of the cylindrical bag filters 105 in a vertical direction.

Referring to FIGS. 4 and 5, there are a plurality of hexahedral bag filters 107. A group of the cylindrical bag filters 105 are fitted to each of the hexahedral bag filters 107.

The operation of the dust collector with an assembly of cylindrical and hexahedral bag filters will be explained.

Alike the related art dust collector, in installation of the dust collector of the present invention at an industrial site, it is required that an end of the inlet tube 102 is connected to the hood in a state the housing 101 is supported on a supporting plane. The hood is placed at a work site dust is produced, actually.

Accordingly, when the fan 109 is put into operation, the air inside of the housing 101 passes through the cylindrical bag filters 105, and the hexahedral bag filters 107 in succession. Then, the air is discharged to an outside of the dust filter through the outlet tube 108, to cause a pressure drop at the inside of the housing 101, which generates a suction force. According to this, the dirty air from the dust source is drawn into the inside of the housing 101 through the inlet tube 102 connected to the hood.

The dirty air drawn into the housing 101 thus is guided directly below by interference of the partition plate 104 fitted to the part having the inlet tube 102 connected thereto, and is kept to move downward. In this instance, a portion of the dust (30–40% of entire dust in the dirty air) settles down directly both by gravity and inertia, and collected to the hopper 101a of the housing 101. On the other hand, rest of the dust moves toward the cylindrical bag filters 105 laden on the dirty air.

Then, the dirty air passes the cylindrical bag filter, when the dust in the dirty air is filtered at the cylindrical bag filter 105, making only clean air enters into the cylindrical bag filter, actually. The clean air is then collected to the hexahedral bag filter 107, and is discharged to an outside of the housing 101 through the outlet tube 108 as the fan 109 fitted to the outlet tube 108 is operated continuously.

It can be noted that During the dust is filtered by the cylindrical bag filters 105 from the dirty air drawn into the housing 1, very small portion of the dirty air moves toward the hexahedral bag filter 107 directly, and filtered, not by the cylindrical bag filter, but by the hexahedral bag filter.

In the meantime, when above operation is continued, there is much dust stuck to the cylindrical bag filter 105, to drop a dust collecting efficiency from a certain moment due to an excessive pressure loss of the housing 101. If this state continues, the fan 109 at the outlet tube 108 is liable to be overloaded, and, when extreme, the motor on the fan is liable to be damaged. Accordingly, for preventing this state in advance, high pressure air (about 4–7 $km/cm^2$) is blown to the cylindrical bag filters 105 periodically (3–6 min. interval) from the nozzle 110a in the air supply tube 110, for removal of the dust stuck to the cylindrical bag filters.

That is, when an air compressor 111 provided on an outside of the housing 101 compresses air in response to a control signal of a controller (not shown), the compressed air is supplied to a part over the bag filter holding plate 103 through the compressed air supply tube 110, and blown downwardly through the plurality of nozzles 110a in the compressed supply tube 110. This high pressure air enters into the cylindrical bag filter 105 through the top opening, to make the dust stuck to the cylindrical bag filter 105 to fall off by the blow pressure of the compressed air and drop down by gravity. Eventually, as there is no excessive pressure loss in the housing 1 for a certain time period, the dust collector shows no deterioration of the dust collecting efficiency.

Most of the dust fallen off the cylindrical bag filter 105 drops by gravity and settles down so as to join with the dust collected in advance in the hopper 101a, and is received at the rotary valve 5 under the hopper 1a. Accordingly, as the dust is removed from the dirty air and only clean air is discharged to an outside of the dust collector, environment of an industrial site becomes clean, at the end.

During operation of the dust collector of the present invention, it is liable that not only the cylindrical bag filters 105 held at the bag filter holding plate 103, but also the hexahedral bag filters 107 shake extremely influenced by the suction of the dirty air into the housing 101 through the inlet tube 102 and the discharge of the clean air to the outside of the housing 101 through the outlet tube 108. For preventing this, one ends of wires 112 are connected to different parts of the hexahedral bag filter 107, and the other ends of the wires 112 are fastened to the housing 111 in a state the wires 112 are tightly pulled.

In the meantime, referring to FIGS. 4 and 5, it is preferable that a plurality of small sized hexahedral bag filters 107 are provided, for collecting the clean air, produced as the dust is filtered at the cylindrical bag filters 105, in groups and thereby discharged smoothly. This is required for convenience of fabrication of the bag filter assembly of the present invention in which the hexahedral bag filter 107 is fitted to the cylindrical bag filters 105, as well as for maintaining a shape of the hexahedral bag filter 107 perfect after fabrication of the bag filter assembly is finished. This is also required for convenience of assembly of the bag filter assembly with the bag filter holding plate 103 in the housing 101. Moreover, this structure permits to expect smooth discharge of the clean air as the cleaned air is collected in groups independently, and discharged through the outlet tube 108.

As has been explained, the dust collector with an assembly of cylindrical and hexahedral bag filters of the present invention has a structure in which the dirty air is drawn into the housing through an upper part thereof and the clean air after the dust is removed is discharged through a lower part of the housing. Accordingly, since a flow direction of the air drawn into, and discharge from, the housing is forward of a direction of dust fall, a direction of gravity, naturally, the present invention has the following advantages.

First, since the dust falls quickly by gravity and inertia when the dust is fallen off the cylindrical bag filter in the housing by the compressed air, there is no re-fly of a portion of the dust. According to this, a filtering performance and a dust recovering performance are enhanced, to reduce a concentration of the dust as well as a pressure drop in the housing, which prolongs a lifetime of the bag filters.

Second, the downward blow of compressed air into the cylindrical bag filter through top opening thereof for removing the dust from the bag filter assembly of cylindrical and hexahedral forms can move farther downward quickly influenced by the downward flow of the air, drawn into the housing, and moving toward the outlet tube. According to this, the dust stuck to the bag filter assembly can be removed smoothly, and a length of the cylindrical bag filter can be extended, to permit reduction of a number of the cylindrical bag filter in proportion to the extension of length, with consequent reduction of a horizontal area of the housing, to reduce a size of the dust collector and an occupied area of the dust collector, substantially.

Third, since the discharge force of the clean air through the outlet tube and the drawing of the dirty air through the inlet tube are smooth even if the fan fitted to the outlet tube is not large more than required, a motor price can be reduced.

Moreover, as the cylindrical bag filters, held at the bag filter holding plate, are supported on the hexahedral bag filters at bottoms thereof, the extreme shaking of the cylindrical bag filters due to drawing of the dirty air and discharge of clean air can be prevented, thereby extending a lifetime of the cylindrical bag filter.

It will be apparent to those skilled in the art that various modifications and variations can be made in the dust collector of the present invention without departing from the spirit or scope of the invention. Thus, it is intended that the present invention cover the modifications and variations of this invention provided they come within the scope of the appended claims and their equivalents.

What is claimed is:

1. A dust collector with an assembly of cylindrical and hexahedral bag filters comprising:

a housing in a form of a hexahedral tank with a closed top having a hopper fitted to a bottom thereof;

an inlet tube connected to one side of an upper part of the housing for introducing dirty air into the housing;

a bag filter holding plate fixed to an upper part of an inside of the housing;

a partition plate inside of the housing in a part the inlet tube is connected to the housing for isolating an upper region with reference to the bag filter holding plate from the other region, and guiding the dirty air introduced through the inlet tube downward directly;

a plurality of cylindrical bag filters each with opened top and bottom held to the bag filter holding plate, for filtering dust from the dirty air introduced into the housing;

a rotary valve fitted to a bottom end of the hopper for receiving the dust filtered by the cylindrical bag filters when the filtered dust falls down, and settled by gravity;

hexahedral bag filters each formed as a unit with the cylindrical bag filters under the cylindrical bag filters for collecting clean air after the dirty air is filtered by the cylindrical bag filters;

an outlet tube connected to one side of the hexahedral bag filters for discharging clean air collected in the hexahedral bag filter to outside of the dust collector;

a fan at an end of the outlet tube for providing a discharge force through the outlet tube and a suction force of the dirty air through the inlet tube; and a compressed air supply tube having a plurality of nozzles above the bag filter holding plate for blowing compressed air from an outside of the dust collector to insides of the cylindrical bag filters in a vertical direction.

2. A dust collector as claimed in claim 1, wherein each of the hexahedral bag filters includes a group of the cylindrical bag filters fitted thereto.

3. A dust collector as claimed in claim 1, wherein each of the hexahedral bag filters is fastened to the housing.

* * * * *

UNITED STATES PATENT AND TRADEMARK OFFICE
CERTIFICATE OF CORRECTION

PATENT NO.   : 6,786,946 B2
DATED        : September 7, 2004
INVENTOR(S)  : Bong Kyu Jung It is certified that error appears in the above-identified patent and that said Letters Patent is hereby corrected as shown below:

Title page,
Item [73], Assignee, please delete "Gong Young Engineering Co., Ltd.", and insert instead -- Gentech Co., Ltd. --.

Signed and Sealed this

Twenty-third Day of August, 2005

JON W. DUDAS
*Director of the United States Patent and Trademark Office*